United States Patent
Paranthaman et al.

(10) Patent No.: US 11,980,939 B2
(45) Date of Patent: May 14, 2024

(54) ALIGNMENT SYSTEM FOR MAGNETIC PARTICULATE MATERIAL USED FOR ADDITIVE MANUFACTURING

(71) Applicant: UT-Battelle, LLC, Oak Ridge, TN (US)

(72) Inventors: Mariappan Parans Paranthaman, Knoxville, TN (US); Brian K. Post, Knoxville, TN (US); Brian C. Sales, Lenoir City, TN (US)

(73) Assignee: UT-BATTELLE, LLC, Oak Ridge, TN (US)

(*) Notice: Subject to any disclaimer, the term of this patent is extended or adjusted under 35 U.S.C. 154(b) by 0 days.

(21) Appl. No.: 17/231,498

(22) Filed: Apr. 15, 2021

(65) Prior Publication Data
US 2021/0323072 A1    Oct. 21, 2021

Related U.S. Application Data (60) Provisional application No. 63/010,718, filed on Apr. 16, 2020.

(51) Int. Cl.
*B22F 12/53*    (2021.01)
*B22F 1/10*    (2022.01)
(Continued)

(52) U.S. Cl.
CPC ............ *B22F 12/53* (2021.01); *B22F 1/10* (2022.01); *B22F 10/34* (2021.01); *B22F 10/85* (2021.01);
(Continued)

(58) Field of Classification Search
None
See application file for complete search history.

(56) References Cited

U.S. PATENT DOCUMENTS

| | | |
|---|---|---|
| 10,586,640 B2 | 3/2020 | Paranthaman et al. |
| 10,766,181 B2 | 9/2020 | Paranthaman et al. |

(Continued)

FOREIGN PATENT DOCUMENTS

| | | | |
|---|---|---|---|
| CN | 1062808 | * | 7/1992 |
| JP | H06166077 | * | 6/1994 |

(Continued)

OTHER PUBLICATIONS

Rajaganesh, S. "Testing of structural materials for additive manufacturing by FLM technology." 2019. Technical university of liberec. p. 1-82 (Year: 2019).*

(Continued)

*Primary Examiner* — Nicholas A Wang
(74) *Attorney, Agent, or Firm* — Scully, Scott, Murphy & Presser, P.C.

(57) ABSTRACT

An electromagnet alignment system for in-situ alignment of a magnetic particulate material is provided. The magnetic particulate material is dispensed through an orifice of a dispensing nozzle used for 3D printing. The system has an electromagnet assembly having a coil. The coil is configured to generate a pulsed magnetic field having a target magnetic flux intensity upon energization of the coil when the magnetic particulate material is being heated and moved through the dispensing nozzle. As a result, the magnetic particulate material is at least partially aligned with respect to a direction by the pulsed magnetic field. The system further includes a power source for implementing the energization of the coil.

31 Claims, 8 Drawing Sheets
(4 of 8 Drawing Sheet(s) Filed in Color)

(51) Int. Cl.
| | |
|---|---|
| B22F 10/34 | (2021.01) |
| B22F 10/85 | (2021.01) |
| B22F 12/13 | (2021.01) |
| B22F 12/90 | (2021.01) |
| B33Y 30/00 | (2015.01) |
| B33Y 40/00 | (2020.01) |
| B33Y 50/02 | (2015.01) |

(52) U.S. Cl.
CPC ............. *B22F 12/13* (2021.01); *B22F 12/90* (2021.01); *B33Y 30/00* (2014.12); *B33Y 40/00* (2014.12); *B33Y 50/02* (2014.12)

(56) References Cited

U.S. PATENT DOCUMENTS

| | | | | |
|---|---|---|---|---|
| 2016/0031158 | A1* | 2/2016 | Ogawa | B29C 64/106 |
| | | | | 425/375 |
| 2017/0312849 | A1* | 11/2017 | Yang | H05B 6/44 |
| 2018/0122570 | A1* | 5/2018 | Li | H01F 1/0578 |
| 2020/0207022 | A1* | 7/2020 | Benedict | B29C 64/336 |

FOREIGN PATENT DOCUMENTS

| | | | |
|---|---|---|---|
| JP | H1022155 | * | 1/1998 |
| KR | 101843323 | * | 3/2017 |
| KR | 101716300 | * | 3/2018 |
| WO | WO9523680 | * | 9/1995 |

OTHER PUBLICATIONS

SeeMeCNC. 2017. HE280 stainless steel replacement nozzles. retrieved from: http://web.archive.org/web/20171003091851/https://www.seemecnc.com/products/he280-stainless-steel-replacement-nozzles (Year: 2017).*

Huber, C. et al., "3D print of polymer bonded rare-earth magnets, and 3D magnetic field scanning with an end-user 3D printer", Appl. Phys. Lett., 2016, pp. 162401-1 to 162401-4, vol. 109.

Li, L. et al., "A novel method combining additive manufacturing and alloy infiltration for NdFeB bonded magnet fabrication", J. Magn. Magn. Mater., 2017, pp. 163-167, vol. 438.

Li, L. et al., "Big Area Additive Manufacturing of High Performance Bonded NdFeB Magnets", Sci. Rep., 2016, pp. 1-7, vol. 6.

Périgo, E. et al., "Additive manufacturing of magnetic materials", Addit. Manuf., 2019, pp. 1-18, vol. 30.

Yang, F. et al., "3D printing of NdFeB bonded magnets with SrFe 12 O 19 addition", J. Alloys Compd., 2019, pp. 900-907, vol. 779.

Leal, R. et al., "Additive manufacturing tooling for the automotive industry", Int. J. Adv. Manuf. Technol., 2017, pp. 1671-1676, vol. 92.

Nagarajan, B. et al., "Characterization of magnetic particle alignment in photosensitive polymer resin: A preliminary study for additive manufacturing processes", Addit. Manuf., 2018, pp. 528-536, vol. 22.

Klahn, C. et al., "Design Strategies for the Process of Additive Manufacturing", Procedia CIRP., 2015, pp. 230-235, vol. 36.

Mikler, C.V. et al., "Laser Additive Manufacturing of Magnetic Materials", JOM., 2017, pp. 532-543, vol. 69.

Borkar, T. et al., "Laser additive processing of functionally-graded Fe—Si—B—Cu—Nb soft magnetic materials", Mater. Manuf. Process., 2017, pp. 1581-1587, vol. 32.

Geng, J., "Bulk Combinatorial Synthesis and High Throughput Characterization for Rapid Assessment of Magnetic Materials: Application of Laser Engineered Net Shaping (LENSTM)", JOM, 2016, pp. 1972-1977.

Paranthaman, M. et al., "Binder Jetting: A Novel NdFeB Bonded Magnet Fabrication Process", JOM., 2016, pp. 1978-1982, vol. 68.

Gandha, K. et al., "Additive manufacturing of anisotropic hybrid NdFeB—SmFeN nylon composite bonded magnets", J. Magn. Magn. Mater., 2018, pp. 8-13, vol. 467.

Shen, A. et al., "UV-assisted direct write of polymerbonded magnets", J. Magn. Magn. Mater., 2018, pp. 220-225, vol. 462.

White, E. et al., "Net Shape Processing of Alnico Magnets by Additive Manufacturing", IEEE Trans. Magn., 2017, pp. 1-6, vol. 53.

Yang, F. et al., "3D gel-printing of Sr ferrite parts", Ceram. Int., 2018, pp. 22370-22377, vol. 44.

Ormerod, J. et al., "Bonded permanent magnets: Current status and future opportunities (invited)", J. Appl. Phys., 1997, pp. 4816-1820, vol. 81.

Li, L. et al., "Additive manufacturing of near-net shape bonded magnets ?: Prospects and challenges", Scr. Mater., 2017, pp. 100-104, vol. 135.

Li, L. et al., "Fabrication of highly dense isotropic Nd—Fe—B nylon bonded magnets via extrusion-based additive manufacturing", Addit. Manuf., 2018, pp. 495-500, vol. 21.

Nlebedim, I.C. et al., "Studies on in situ magnetic alignment of bonded anisotropic Nd—Fe—B alloy powders", J. Magn. Magn. Mater., 2017, pp. 168-173, vol. 422.

Khazdozian, H. et al., "Low-Field Alignment of Anisotropic Bonded Magnets for Additive Manufacturing of Permanent Magnet Motors", JOM, 2019, pp. 626-632.

Martin, J. et al., "Designing bioinspired composite reinforcement architectures via 3D magnetic printing", Nat. Commun., 2015, pp. 1-7.

Kim, Y. et al., "Printing ferromagnetic domains for untethered fast-transforming soft materials", Nature, 2018, pp. 274-279, vol. 558.

Sander, J. et al., "High-performance battery electrodes via magnetic templating", Nat. Energy, 2016, pp. 1-7.

Reyes, C. et al., "Three-Dimensional Printing of a Complete Lithium Ion Battery with Fused Filament Fabrication", ACS Appl. Energy Mater., 2018, pp. 5268-5279.

* cited by examiner

ALIGNMENT SYSTEM FOR MAGNETIC PARTICULATE MATERIAL USED FOR ADDITIVE MANUFACTURING

CROSS REFERENCE TO RELATED APPLICATION

This application claims the benefit of priority from U.S. Provisional Application No. 63/010,718, filed Apr. 16, 2020, the contents of which are incorporated herein by reference.

STATEMENT REGARDING FEDERALLY SPONSORED RESEARCH OR DEVELOPMENT

This disclosure was made with government support under a research project supported by Prime Contract No. DE-AC05-00OR22725 awarded by the U.S. Department of Energy. The government has certain rights in this disclosure.

BACKGROUND

Additive manufacturing (AM) (also known as 3D printing) is a trending technology for rapid-prototyping and fabrication of net-shaped components, such as for the manufacturing of permanent magnets and other magnetic materials. By avoiding the losses in subtractive manufacturing, AM processes can reduce materials waste and energy consumption. Also, AM processes have the benefits of minimizing or eliminating post-manufacturing machining and tooling typically required for conventional manufacturing.

Permanent magnets enable conversion of energy between mechanical and electrical. Although the energy density of bonded permanent magnets is normally less compared to sintered magnets, there are practical reasons for the applications of bonded permanent magnets. These applications are the reasons for which bonded permanent magnets are continuously occupying increased market share.

Binders for bonded permanent magnets are selected to be suitable above the maximum operating temperatures of the widely used Nd—Fe—B magnets; hence the binders do not limit high-temperature stability needed for application of Nd—Fe—B magnets. In addition, the use of binders in bonded permanent magnets can help overcome some of the limitations of sintered Nd—Fe—B magnets, including low corrosion resistance, poor mechanical stability and high thermal losses.

Bonded permanent magnets are conventionally manufactured either by compression molding with a thermosetting binder, or injection molding with a thermoplastic binder. The economic disadvantage of the dies used in conventional molding can be eliminated by applying 3D printing (AM) technologies to bonded magnets production.

Process variables that are controlled for printing bonded permanent magnet shapes include magnet powder properties, processing temperature, loading factor, magnet density, and degree of alignment of the magnet powder particles and/or particle magnetic domains. Considering these process variable, there would be a significant advantage for a 3D printer-adaptable system exhibiting improved in-situ control of alignment of magnetic particulate material such as filamentary magnetic material as it is dispensed during additive manufacturing with control of processing temperature.

SUMMARY OF THE DISCLOSURE

In one aspect, the disclosure provides an electromagnet alignment system for in-situ alignment of at least one magnetic particulate material dispensed through an orifice of a dispensing nozzle used for 3D printing. The system includes an electromagnet assembly. The electromagnet assembly includes a coil. The coil is configured to generate a pulsed magnetic field having a target magnetic flux intensity upon energization of the coil, when the at least one magnetic particulate material is being heated and moved through the dispensing nozzle, such that the at least one magnetic particulate material is at least partially aligned with respect to a direction by the pulsed magnetic field. The system further includes a power source for implementing the energization of the coil.

In some embodiments, the target magnetic flux intensity is in a range of 0.2 T-1 T.

In some embodiments, the target magnetic flux intensity is in a range of 0.3-0.5 T.

In some embodiments, the target magnetic flux intensity is in a range of 0.4-0.6 T.

In some embodiments, the target magnetic flux intensity is in a range of 0.5-0.7 T.

In some embodiments, the target magnetic flux intensity is in a range of 0.6-0.8 T.

In some embodiments, the target magnetic flux intensity is in a range of 0.7-0.9 T.

In some embodiments, the target magnetic flux intensity is in a range of 0.8-1.0 T.

In some embodiments, the target magnetic flux intensity is based on at least one of: the at least one magnetic particulate material; a temperature of the heating of the at least one magnetic particulate material; and a binding material used in conjunction with the at least one magnetic particulate material.

In some embodiments, the binding material includes a polymer material.

In some embodiments, a pulse width of the pulsed magnetic field is in a range of 1 millisecond to 10 seconds, and the pulse width is determined based on a flow rate of the least one magnetic particulate material through the orifice of the dispensing nozzle.

In some embodiments, the pulse width is in a range of 1 second to 5 seconds.

In some embodiments, the pulse width is in a range of 2 seconds to 6 seconds.

In some embodiments, the pulse width is in a range of 3 seconds to 7 seconds.

In some embodiments, the pulse width is in a range of 4 seconds to 8 seconds.

In some embodiments, the pulse width is in a range of 5 seconds to 9 seconds.

In some embodiments, the pulse width is in a range of 6 seconds to 10 seconds.

In some embodiments, the electromagnet assembly includes a tube having an inner surface and an outer surface, and the coil is cylindrical and wound around the outer surface of the tube.

In some embodiments, the tube, the coil and the dispensing nozzle are concentric.

In some embodiments, the coil has an inner surface radially proximal to the dispensing nozzle and an outer surface radially distal to the dispensing nozzle; the coil has a first radius defined radially from a longitudinal central axis of the coil to the inner surface of the coil; and the coil has a second radius defined radially from the longitudinal central axis to the outer surface of the coil.

In some embodiments, the first radius is about 25.4 mm; and the second radius is in a range of about 101.6 mm to about 254 mm.

In some embodiments, the coil has a top surface and a bottom surface opposite each other in a direction of the longitudinal central axis; the coil has a length defined between the top surface and the bottom surface in the direction of the longitudinal central axis; and the length of the coil is in a range of about 177.8 mm to 203.2 mm.

In some embodiments, the dispensing nozzle includes: a connecting portion connected to a delivery port of an extruder of a 3D printer used for the 3D printing; a terminal end including the orifice; and an elongated portion extending between the connecting portion and the terminal portion. The alignment system further includes a heating layer attached to an outer surface of the elongated portion of the dispensing nozzle for maintaining the temperature of the elongated portion at a predetermined value.

In some embodiments, the connecting portion includes a threaded portion.

In some embodiments, the heating layer includes a heating tape and a controller for controlling the heating temperature of the heating tape.

In some embodiments, the dispensing nozzle is made of a non-magnetic stainless steel.

In some embodiments, nylon is being used as a binding material with the at least one magnetic particulate material and the predetermined value of the temperature is in a range of 180° C.-250° C.

In some embodiments, polyphenylene sulfide (PPS) is being used as a binding material with the at least one magnetic particulate material and wherein the predetermined value of the temperature is in a range of 270° C.-324° C.

In some embodiments, the alignment system further includes an insulation layer provided between the heating layer and the inner surface of the tube of the electromagnet assembly, and the insulation layer is configured to negate transferring heat from the heating layer to the tube.

In some embodiments, the heating layer and the insulation layer are snugly provided between the outer surface of the elongated portion of the dispensing nozzle and the inner surface of the tube of the electromagnet assembly, such that the dispensing nozzle and the electromagnet assembly are coupled to each other.

In some embodiments, the tube is made of a thermo-insulation and non-magnetic material.

In some embodiments, the alignment system further includes a temperature sensor being configured to provide an instant temperature at the elongated portion of the dispensing nozzle, and the heating layer is adjustable based on the instant temperature for maintaining the temperature of the elongated portion at the predetermined value.

In some embodiments, the alignment system further includes a support associated with the electromagnet assembly. The support includes a base having an opening. The electromagnet assembly is attached to the base, such that the central passageway defined by the inner surface of the tube is aligned with the opening of the base.

In some embodiments, the alignment system further includes a cooling device associated with the coil of the electromagnet assembly. The cooling device is configured to maintain the temperature of the coil at a predetermined value.

In some embodiments, the predetermined value is about 80 degrees.

BRIEF DESCRIPTION OF THE FIGURES

The file of this patent contains at least one drawing executed in color. Copies of this patent with color drawing(s) will be provided by the Patent and Trademark Office upon request and payment of the necessary fee.

DETAILED DESCRIPTION OF THE DISCLOSURE

In addition, the figures are illustrative rather than limiting, and thus are not necessary drawn in accordance with scales.

Figure 1:
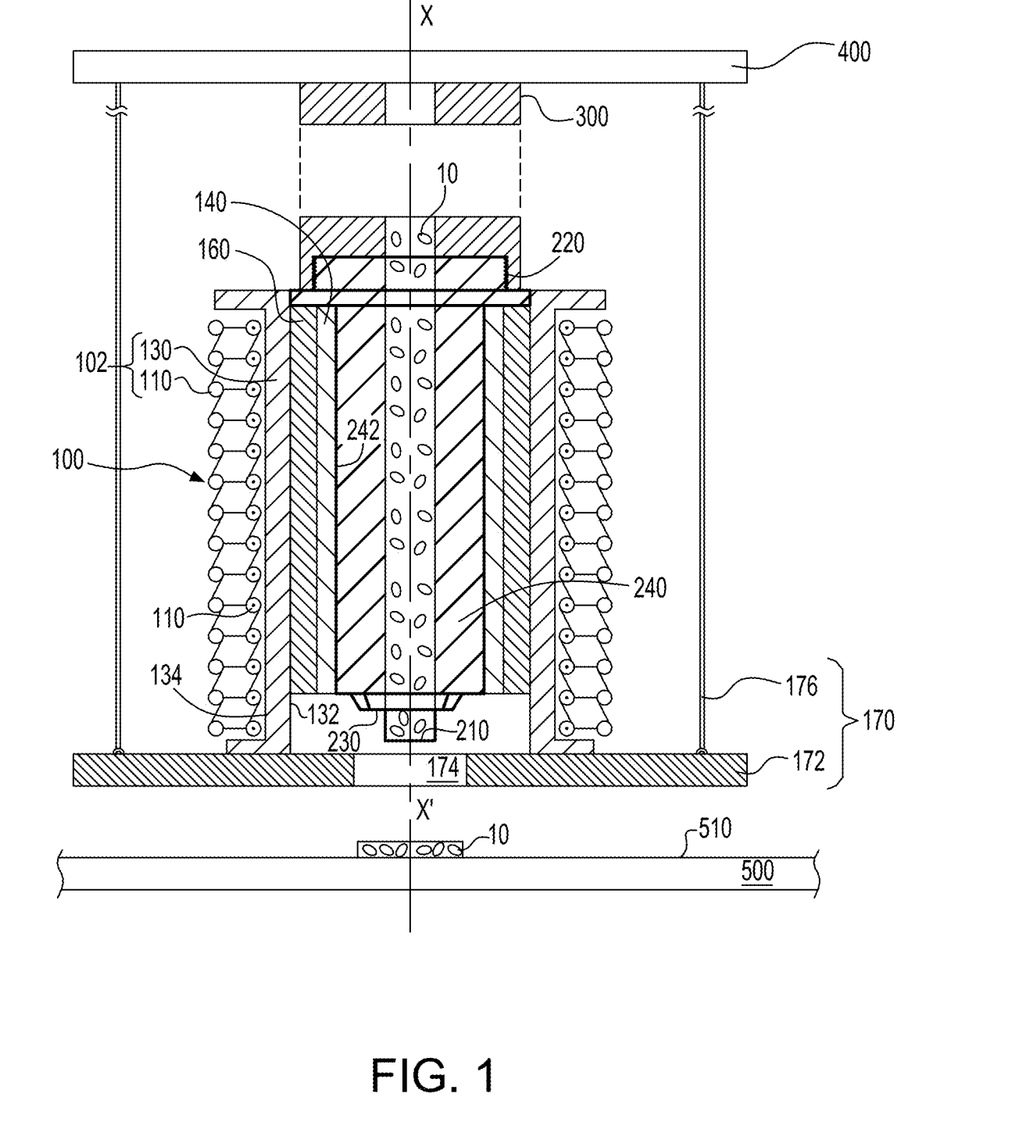
FIG. 1 is a schematic sectional view of an alignment system pursuant to an embodiment of the present disclosure, which can be used with an Big Area Additive Manufacturing (BAAM) system.
Figure 2:
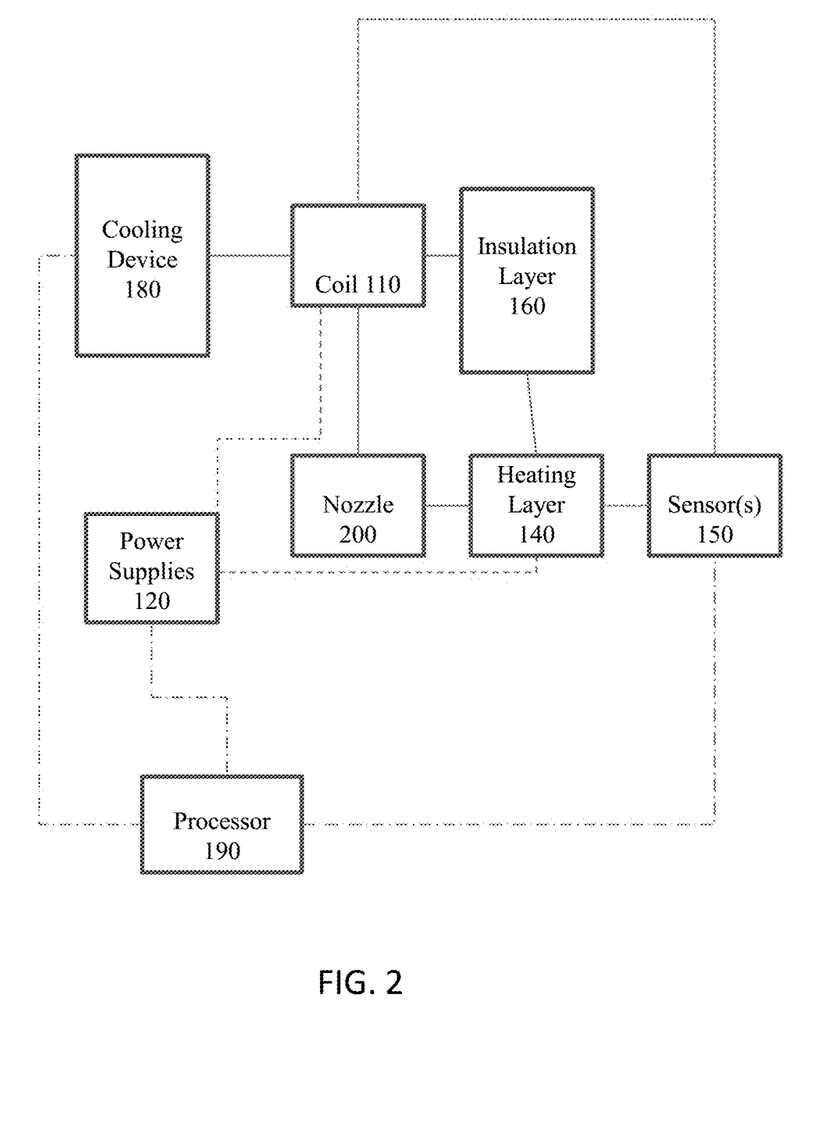
FIG. 2 is a block diagram showing different functional components of the alignment system.
Figure 8:
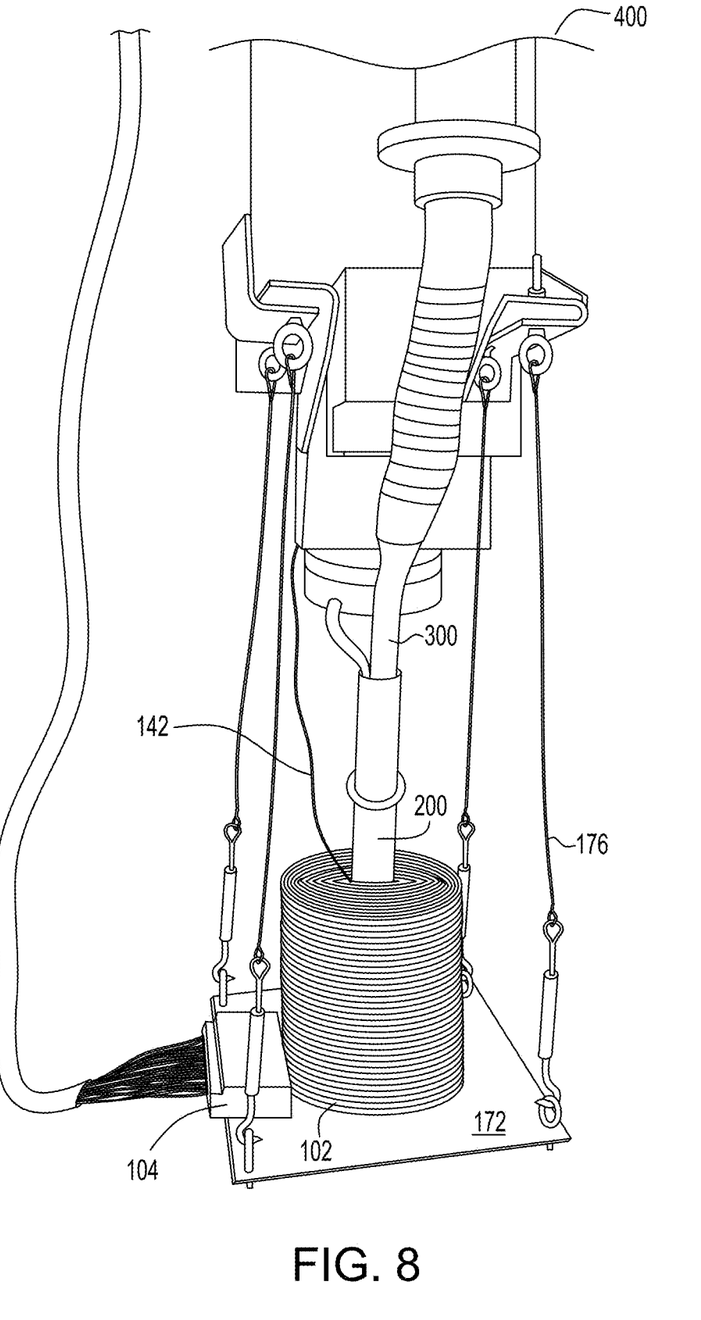
FIG. 8 is a schematic perspective view of the alignment system and the BAAM system.

Illustrative embodiments of the present disclosure provide a 3D printing machine and process that are advantageous in that they embody an electromagnet alignment system that provides in-situ alignment of the magnetic particulate material(s) as it is being dispensed to form a 3D shape or body, typically by layer-by-layer deposition. For purposes of illustration and not limitation, FIG. 1 shows a schematic sectional view of an electromagnet alignment system 100 for in-situ alignment of at least one magnetic particulate material 10 dispensed through an orifice 210 of a dispensing nozzle 200 used for 3D printing. The electromagnet alignment system 100 is also shown in FIG. 8, which is a schematic perspective view. FIG. 2 is a block diagram showing various functional components of the electromagnet alignment system 100 and the dispensing nozzle 200. In FIG. 2, the dash lines indicate power supplying; the dotted lines indicate temperature sensing; dash-dot-dash lines indicate controlling and signal feeding back; and the solid lines indicate physical association.

Figure 3:
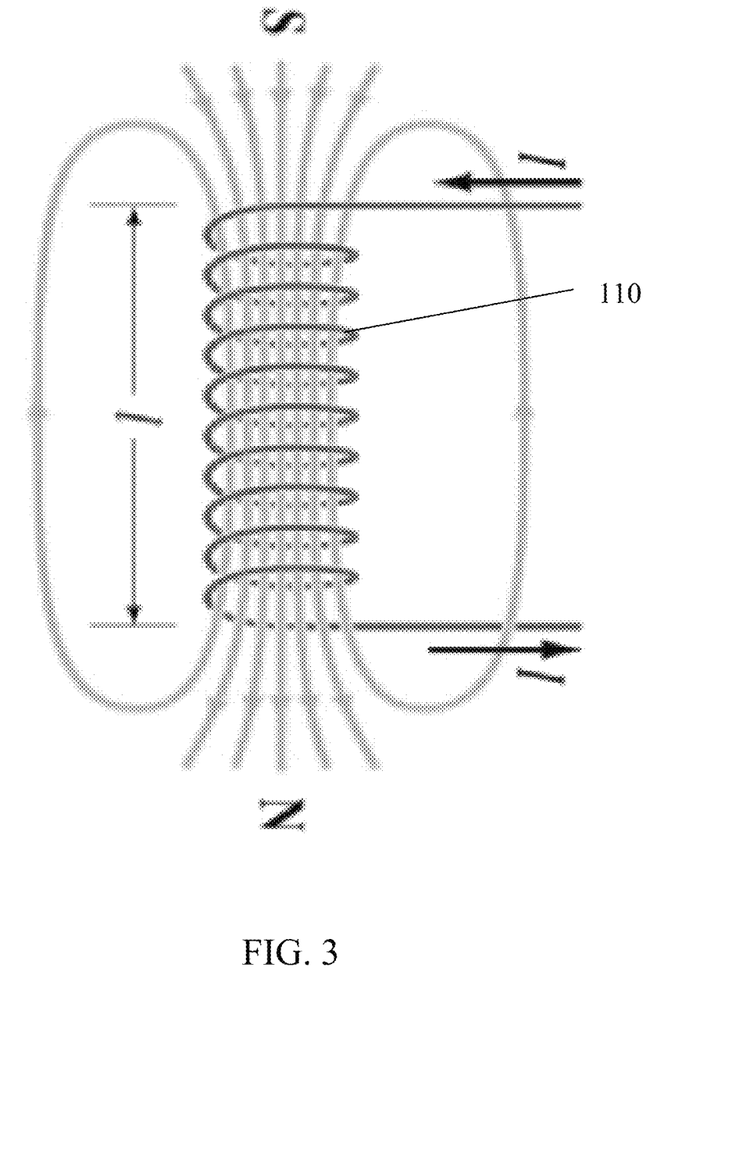
FIG. 3 is a schematic view showing an example of direction of a pulsed magnetic field generated by the alignment system.

The electromagnet alignment system 100 includes an electromagnet assembly 102 includes a coil 110. The coil 110 is configured to generate a pulsed magnetic field having a target magnetic flux intensity upon energization of the coil, when the magnetic particulate material 10 is being heated and moved through the dispensing nozzle 200, such that the magnetic particulate material 10 is at least partially aligned with respect to a direction by the pulsed magnetic field. An example of the direction of the pulsed magnetic field is shown in FIG. 3. As shown, the current I (pulsed current) passes through the coil 110 in a direction from the top of the coil to the bottom of the coil. As a result, the pulsed magnetic field is generated from top to bottom within the coil ("S" is on top; "N" is on the bottom). However, in other aspects, the pulsed current may be reversed and the magnetic field's direction is reversed (bottom to top).

The electromagnet alignment system 100 further includes a power source 120 (shown in FIG. 2), which is electrically connected to the coil 110 for implementing the energization of the coil 110. The coil can include one or more groups of windings, which are connected to the power source 120 in parallel.

The target magnetic flux intensity is determined based on one or more of the following factors: the property of the magnetic particulate material 10; a temperature of heating of the magnetic particulate material 10; and a binding material used in conjunction with the magnetic particulate material 10. For example, a higher heating temperature typically leads to larger flowing speed of the magnetic particulate material and the binders. As a result, a higher pulsed magnetic field may be needed for aligning the fast-flowing material.

The binding material can be a thermoplastic polymer material. The thermoplastic polymers include at least one of nylon, polyphenylene sulfide, polycarbonate and ABS.

The target magnetic flux intensity can be in a range of 0.2 T-1 T. For example, the target magnetic flux intensity can be in a range of 0.3-0.5 T, a range of 0.4-0.6 T, a range of 0.5-0.7 T, a range of 0.6-0.8 T, a range of 0.7-0.9 T or a range of 0.8-1.0 T. Typically, the degree of alignment increases as the target magnetic flux intensity increases.

The pulse width may be determined based on a flow rate of the magnetic particulate material 10 through the orifice 210 of the dispensing nozzle 200. For example, a higher flow rate may have longer pulses. The pulse width of the pulsed magnetic field can be in a range of 1 millisecond to 10 seconds. For example, the pulse width can be in a range of 1 second to 5 seconds, a range of 2 seconds to 6 seconds, a range of 3 seconds to 7 seconds, a range of 4 seconds to 8 seconds, a range of 5 seconds to 9 seconds or a range of 6 seconds to 10 seconds. For example, each of the specific ranges is customarily provided, in response to the flow rate of the magnetic particulate material, to increase alignment of the magnetic particulate material over the length of dispensing nozzle 200.

In the shown embodiment, the electromagnet assembly 102 further includes a tube 130 having an inner surface 132 and an outer surface 134. The coil 110 is cylindrical and wound around the outer surface 134 of the tube 130. The tube 130 can be made of a thermo-insulation and non-magnetic material.

For example, the tube 130, the coil 110 and the dispensing nozzle 200 are concentric along a longitudinal central axis XX' as shown in FIG. 1.

Figure 4:
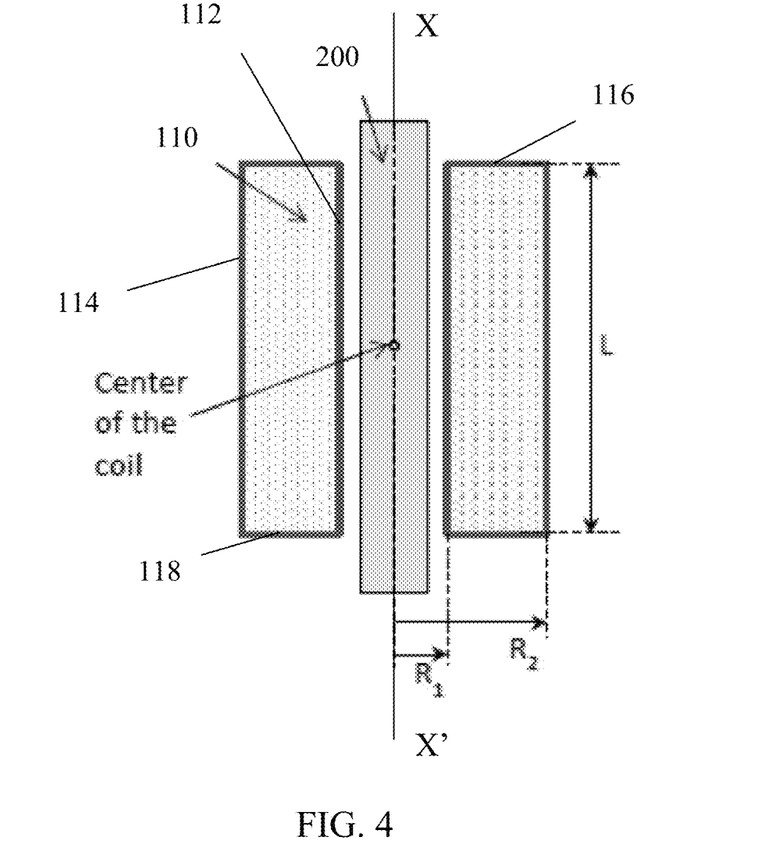
FIG. 4 is a schematic view showing a coil of the alignment system and a modified nozzle of the BAAM system.

FIG. 4 is a schematic view showing the dispensing nozzle 200 and the coil 110. The coil 110 has an inner surface 112 radially proximal to the dispensing nozzle 200 and an outer surface 114 radially distal to the dispensing nozzle 200. The coil 110 has a first radius R1 defined radially from the longitudinal central axis XX' to the inner surface 112 and a second radius R2 defined radially from the longitudinal central axis XX' to the outer surface 114. The first radius R1 can be about 25.4 mm and the second radius R2 can be in a range of about 101.6 mm to about 254 mm.

The coil 110 has a top surface 116 and a bottom surface 118, which are opposite each other in the direction of the longitudinal central axis XX'. The coil 110 has a length L defined between the top surface 116 and the bottom surface 118. The length of the coil 110 can be in a range of about 177.8 mm to 203.2 mm.

Figure 5:
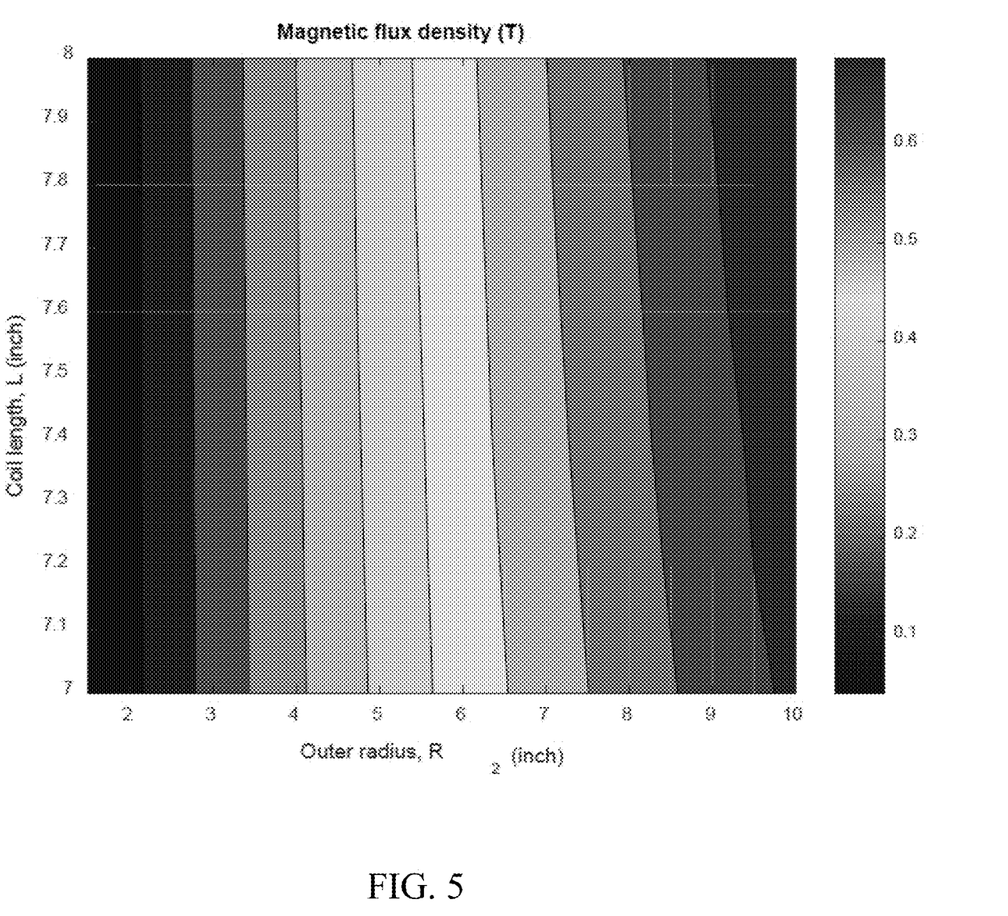
FIG. 5 is a diagram showing the relationship between radii and length of the coil and the magnetic field to provide respective density ranges of the alignment system.

FIG. 5 is a diagram showing the relationship between radii and length of the coil 110 and the pulsed magnetic field generated by the coil 110 for enabling the respective density ranges of the electromagnetic alignment system 100. As shown in FIG. 5, the magnetic flux density increases with an increased in the outer radius (second radius R2) of the coil.

The length of the coil L has a larger impact on the magnetic flux density for higher densities. In some aspects of the disclosure, to achieved higher flux densities a coil with a larger outer radius may be used.

The dispensing nozzle 200 is part of the 3D printing machine (such as, a BAAM system) and customized for the purpose of being used with the electromagnet alignment system 100 pursuant to this embodiment.

As shown in FIG. 1, the dispensing nozzle 200 includes a top connecting portion 220 connected to an extruder 300 that is used with the 3D printing machine for delivering the magnetic particulate material 10. The extruder 300 can be mounted to a gantry 400 of the 3D printing machine, such that the movement of the extruder 300 is controllable through the gantry 400. For example, the top connecting portion 220 can be a threaded portion that is threadedly connected to a mating threaded portion of the extruder 300. Once connected, the delivery port of the extruder 300 is aligned with the receiving port of the dispensing nozzle 200 to permit the magnetic particulate material to flow from the extruder 300 into the dispensing nozzle 200. Alternatively, instead of being connected directly to an extruder of the 3D printing machine, the customized dispensing nozzle 200 can be retrofitted to an existing dispensing nozzle which is in turn connected to the extruder.

The dispensing nozzle 200 further includes a bottom terminal portion 230, which is longitudinally opposite the top connecting portion 220. The orifice 210 of the dispensing nozzle 200 is provided at the bottom end of the bottom terminal portion 230. The dispensing nozzle 200 additionally includes an elongated portion 240 extending between the top connecting portion 220 and the bottom terminal portion 230. The length of the elongated portion 240 is determined in accordance with the length L of the coil 110.

The dispensing nozzle 200 is made of a non-magnetic material (i.e., the magnetic permeability is equal to 1). For example, the nozzle can be made of non-magnetic stainless steel.

As shown in FIG. 1, the electromagnet alignment system 100 further includes a heating layer 140 attached to an outer surface 242 of the elongated portion 240 of the dispensing nozzle 200. The heating layer 140 functions to maintain the temperature of the elongated portion 240 at a predetermined value. For example, the heating layer 140 can be a heating tape wrapped around, continuously or intermittently, the outer surface 242 of the elongated portion 240. The heating tape can have a controller for controlling the heating temperature of the heating tape. The power supply for the heating layer can be same as or different from the power supply for the electromagnet assembly. In addition, the controller for controlling the heating layer can be same as or different from the controller for controlling the electromagnet assembly.

Furthermore, the electromagnet alignment system 100 includes a temperature sensor 150 associated with the dispensing nozzle 200. The temperature sensor may be a non-magnetic temperature probe. In other aspects of the disclosure, the temperature sensor may be an IR camera pointed to the nozzle. For example, the temperature sensor 150 can be configured to provide an instant temperature at the elongated portion 240 of the dispensing nozzle 200. The heating function of the heating layer 140 can be adjusted based on the instant temperature for maintaining the temperature of the elongated portion 240 at the predetermined value.

When nylon is being used as a binding material with the magnetic particulate material 10, the predetermined value of the temperature is in a range of 180° C.-250° C. When polyphenylene sulfide (PPS) is being used as a binding material with the magnetic particulate material 10, the predetermined value of the temperature is in a range of 270° C.-324° C.

As shown in FIG. 1, the electromagnet alignment system 100 further includes an insulation layer 160, which is sandwiched between the inner surface 132 of the tube 130 and the heating layer 140. The insulation layer 160 is configured to reduce heat-transferring from the heating layer 140 to the tube 130 and thus, reduce heat-transferring from the heating layer 140 to the coil 110. The insulation layer 160 can be made of a ceramic material. Alternatively, the tube can be an Inconel® metal tube.

The tube 130, which is made of a thermo-insulation material, can supplement the reduction of heat-transferring from the heating layer 140 to the coil 110.

Pursuant to the embodiment, the heating layer 140 and the insulation layer 160 are snugly provided between the outer surface 242 of the elongated portion 240 of the dispensing nozzle 200 and the inner surface 132 of the tube 130 of the electromagnet assembly 102, such that the dispensing nozzle 200 and the electromagnet assembly 102 are coupled to each other through pressure and friction, to prevent the dispensing nozzle 200 from moving with respect to the electromagnet assembly 102. As a result, the movement of the dispensing nozzle 200 and the electromagnet assembly 102 are in concert. For example, the thickness of the heating layer 140 and the insulation layer 160 and/or the material of the heating layer 140 and the insulation layer 160 can be selected to ensure that the dispensing nozzle 200 does not move with respect to the electromagnet assembly 102, once the heating layer 140 and the insulation layer 160 are sandwiched between the dispensing nozzle 200 and the electromagnet assembly 102.

As shown in FIG. 1, the electromagnet alignment system 100 further includes a support 170 associated with the electromagnet assembly 102. The support 170 includes a base 172 having an opening 174. The electromagnet assembly 102 can be attached to the top surface of the base 172. Once the electromagnet assembly 102 is attached to the base 172, the opening 174 can be substantially aligned with the central passageway defined by the inner surface 132 of the tube 130. The dispensing nozzle 200, the heating layer 140 and the insulation layer 160 are accommodated in the central passageway of the tube 130. In addition, once the electromagnet assembly 102 is attached to the base 172, the opening 174 can be substantially aligned with the orifice 210 of the dispensing nozzle 200. Thus, the magnetic particulate material 10 flowing out of the orifice 210 can be deposited on a top surface 510 of a substrate 500 that is part of the 3D printing machine for depositing layers of magnetic particulate material 10. The support 170 further includes a plurality of cables 176, which flexibly connect the base 172 to the gantry 400 of the 3D printing machine. Alternatively, the electromagnet assembly 102 can be configured to sit on the base 172 as long as the alignment of the orifice 210 with the opening 174 can be ensured.

Referring to FIG. 8, which is a schematic perspective view of the electromagnet alignment system 100. The description of the elements of the electromagnetic alignment system, which have been discussed previously with respect to FIGS. 1-4, is omitted for brevity purpose. The electromagnet alignment system 100 further includes one or more power cables 104 connected to the coil 110 for energizing the coil 110. The one or more power cables 104 can be provided consistently with the coil 110. According to one embodiment, the coil 110 can have N (N is an integral number) sub-coils connected to each other in parallel and, consistently, the power cables 104 can have N individual cables each configured to energize a respective sub-coil; the energization of the sub-coils can be controlled independently. In addition, the electromagnetic alignment system 100 includes a power wire 142, which is electrically connected to the heating layer 140 for providing electrical power to the heating layer 140. The power cables 104 and the power wire 142 can be connected to a same power source or to different power sources.

As shown in FIG. 2, the electromagnet alignment system 100 further includes a cooling device 180 associated with the coil 110 of the electromagnet assembly 102. The cooling device 180 is configured to maintain the temperature of the coil 110 at or below a predetermined value during operation. For example, the predetermined value of the temperature at the coil 110 is about 80° C. An additional temperature sensor, such as, an IR camera pointing to the coil 110, can be optionally provided for the purpose of maintaining the temperature of the coil 110 at or below the predetermined value. The cooling device 180 can use a fluid (such as, water) as a cooling medium. In addition, a separate support (such as, cables suspending from the gantry of the 3D printing machine) can be provided to the cooling device.

As shown in FIG. 2, the electromagnet alignment system 100 further includes a programmable hardware processor 190, which serves as a central control unit for controlling the operations of all the other components of the alignment system. For example, the processor 190 can be in communication with the power source 120 to control the energization of the coil 110, so as to control the target magnetic flux intensity and/or the pulse width of the pulsed magnetic field. The processor 190 can be in communication with the temperature sensor 150 to determine a temperature at the dispensing nozzle 200 (such as, the temperature at the elongated portion 240 of the dispensing nozzle 200), based on which the processor 190 can be in communication with the heating layer 140 to control the operation of the heating layer, so as to maintain the temperature at the dispensing nozzle 200 at a predetermined value. In addition, the processor 190 can be in communication with the temperature sensor 150 to determine a temperature at the coil 110, based on which the processor 190 can be in communication with the cooling device 180 to maintain the temperature at the coil 110 at or below a predetermined value.

The processor 190 may be one or more CPUs. In other aspects of the disclosure, the processor may be a microcontroller or microprocessor or any other processing hardware such as an FPGA. In an aspect of the disclosure, the processor 190 may be configured to execute one or more programs stored in a computer readable storage device. The computer readable storage device can be RAM, persistent storage or removable storage. A storage device is any piece of hardware that is capable of storing information, such as, for example without limitation, data, programs, instructions, program code, and/or other suitable information, either on a temporary basis and/or a permanent basis.

Figure 6:
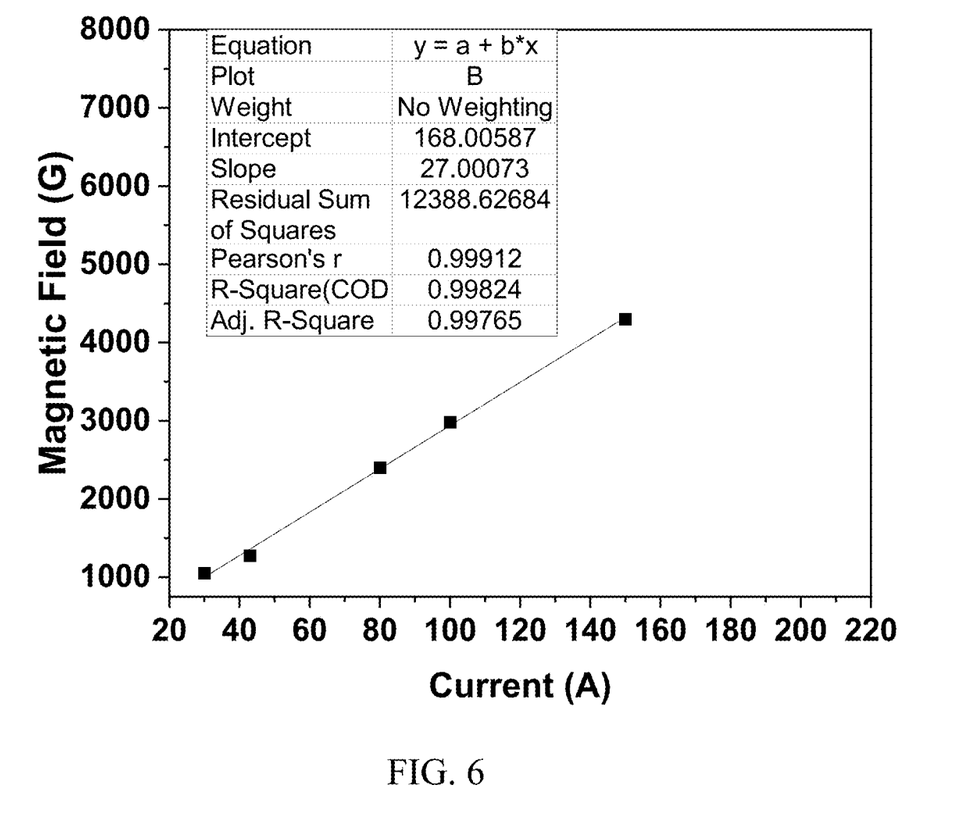
FIG. 6. a diagram showing magnetic field generated at the alignment system.

The electromagnet alignment system 100, according to this embodiment, is capable of printing NdFeB nylon magnets with more than 80% alignment using the pulsed magnetic field applied to the dispensing nozzle 200. As shown in FIG. 6, about 0.5 T (5,000 Oe) can be generated at the dispensing nozzle 200 during printing.

Figure 7:
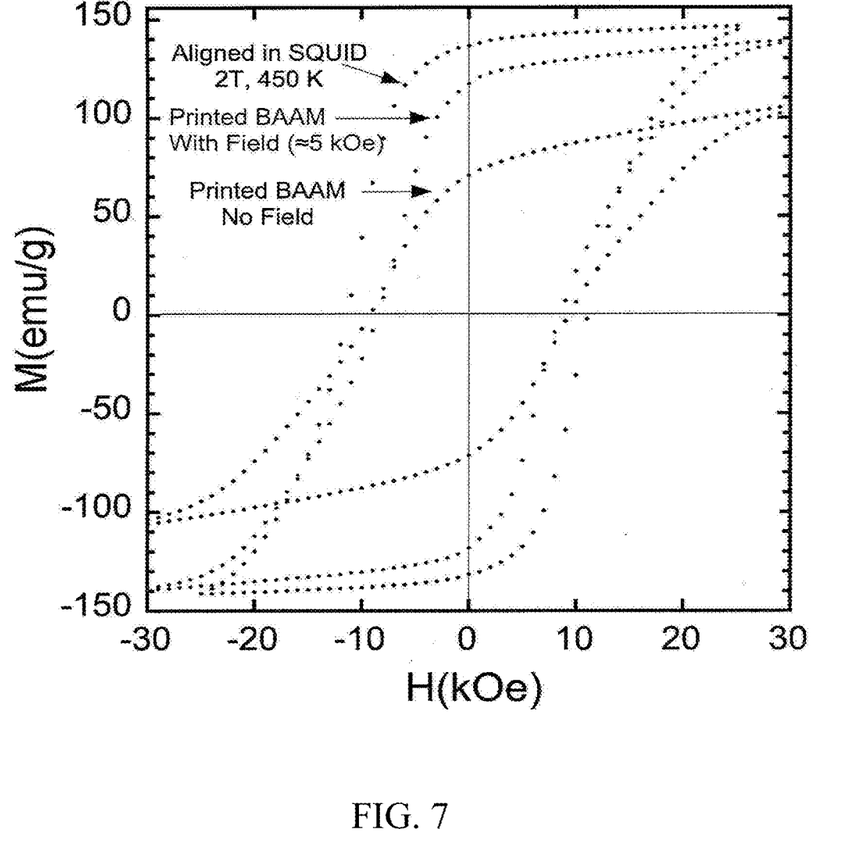
FIG. 7 is a diagram showing comparative M-H loops related to the alignment system.

FIG. 7 is a diagram showing comparative M-H loops related to the electromagnet alignment system 100 for producing NdFeB nylon magnets. The M-H loops of the as-printed magnets with and without field and post-aligned at 450 K and 2 T magnetic field are shown in FIG. 7. As shown, about 80% of alignment can be as achieved.

In practicing embodiments of the present disclosure, the magnetic particulate material and the polymeric binder, such as a thermoplastic or other polymer, are melted, compounded, and extruded in the deposition head of a 3D printing system. The thermoplastic polymer should also have the ability to harden after deposition and cooling. The thermoplastic polymer can have a melting point of at least or above 175° C., 180° C., 185° C., 190° C., 195° C., 200° C., 225° C., 250° C., 275° C., or 300° C. Some examples of such thermoplastic polymers include polyamides (e.g., Nylon 6,6), polyphenylene sulfide, polyphenylene oxide, acrylonitrile butadiene styrene, polyether ether ketone, polyoxymethylene, polyether sulfone, polycarbonates (e.g., polylactic acid), polyetherimide, polyvinyl addition polymers (e.g., polyacrylonitrile, polyvinylchloride, polytetrafluoroethylene, and polystyrene), polyesters, and polybenzimidazole. In some embodiments, the thermoplastic polymer is a homopolymer, which may have any of the above compositions. In other embodiments, the thermoplastic polymer is a copolymer, which may be, for example, a block, alternating, random, or graft copolymer.

The thermoplastic polymer can be crosslinkable so as to behave as a pliable thermoplastic material at relatively low temperature during deposition of the combined material, while being able to transform into a hardened durable non-pliable thermoset state after deposition and construction of the magnetic object. Thus, the polymeric binder can be considered a hybrid polymer, i.e., having characteristics of both a thermoplastic and a thermoset. However, at the thermoset stage, the polymeric binder forms a three dimensional covalent network, and thus, cannot revert back to a thermoplastic state, as expected for a thermoset polymer. In some embodiments, the thermoplastic polymer is not crosslinkable. Exemplary hybrid polymers include, for example, polyurethanes, epoxy-containing polymers, and polymers containing vinyl acetate units.

Thermoplastic, hybrid, and other polymers that can be used in practice of embodiments of the present invention are described in detail in WO 2018/081527 A1 published May 3, 2018, the entire disclosure of which is incorporated herein by reference.

Practice of embodiments of the present disclosure also employ magnetic particles having a hard magnetic material composition (i.e., "magnetic particles") can have any suitable particle size, but typically no more than or less than 1 mm, 0.5 mm, 200 microns, 100 microns, 50 microns, 1 micron, 0.5 micron, 0.2 micron, or 0.1 micron, or a distribution of particles bounded by any two of these values. The magnetic particles can be, for example, nanoparticles (e.g., 1-500 nm) or microparticles (e.g., 1-500 microns). The term "hard magnetic material composition" refers to any of the ferromagnetic or ferrimagnetic compositions, that retains its magnetization even when the source of magnetic field is removed, known in the art as materials with high coercivity, generally at least or above 300, 400, or 500 Oe. Thus, the magnetic particles considered herein are not paramagnetic or super paramagnetic particles. The magnetic particles are magnetically anisotropic and may have any desired shape, e.g., substantially spherical, ovoid, filamentous, or plate-like.

Typically, the permanent magnet composition is metallic or a metal oxide, and often contains at least one element selected from iron, cobalt, nickel, copper, gallium, and rare earth elements, wherein the rare earth elements are generally understood to be any of the fifteen lanthanide elements along with scandium and yttrium. In particular embodiments, the permanent magnet composition includes iron, such as magnetite, lodestone, or alnico. In other particular embodiments, the permanent magnet composition contains at least one rare earth element, particularly samarium, praseodymium, and/or neodymium. A particularly well-known samarium-based permanent magnet is the samarium-cobalt (Sm—Co alloy) type of magnet, e.g., $SmCo_5$ and $Sm_2Co_{17}$. A particularly well-known neodymium-based permanent magnet is the neodymium-iron-boron (Nd—Fe—B) type of magnet, typically having the formula $Nd_2Fe_{14}B$ which may also contain praseodymium and/or dysprosium. Other rare earth-containing hard magnetic material compositions include, for example, $Pr_2Co_{14}B$, $Pr_2Fe_{14}B$, and Sm—Fe—N. The hard magnet material may or may not have a composition that excludes a rare earth metal. Some examples of non-rare earth hard magnetic materials include MnBi, AlNiCo, and ferrite-type compositions, such as those having a Ba—Fe—O or Sr—Fe—O composition.

The magnetic particles are generally included in the combined material in an amount of at least or above 20 wt. % by weight of the polymer binder and magnetic particles (or alternatively, by weight of the combined material). In different embodiments, the magnetic particles are included in an amount of at least or above 20, 30, 40, 50, 60, 70, 80, 90, 92, 95, or 98 wt. %, or in an amount within a range bounded by any two of the foregoing values. Alternatively, the magnetic particles are in an amount of at least or above 40, 45, 50, 55, 60, 65, 70, 75, or 80 vol %.

In some embodiments, the combined material may or may not further include non-magnetic particles having a composition that confers additional tensile strength to the bonded magnetic after curing. The non-magnetic particles can include, but are not limited to, carbon, metal, metal oxide, metal carbon particles, anti-oxidant compounds, and plasticizers. The particles may have any suitable morphology, including, for example, spheroidal or other particles or filaments.

Magnetic particles, non-magnetic particles and/or other additive components that can be used in practice of embodiments of the present disclosure are described in detail in WO 2018/081527 A1 published May 3, 2018, the entire disclosure of which is incorporated herein by reference.

In the discussion and claims herein, the term "about" indicates that the value listed may be somewhat altered, as long as the alteration does not result in nonconformance of the process or device. For example, for some elements the term "about" can refer to a variation of ±0.1%, for other elements, the term "about" can refer to a variation of ±1% or ±10%, or any point therein.

As used herein terms such as "a", "an" and "the" are not intended to refer to only a singular entity, but include the general class of which a specific example may be used for illustration.

As used herein, terms defined in the singular are intended to include those terms defined in the plural and vice versa.

References in the specification to "one aspect", "certain aspects", "some aspects" or "an aspect", indicate that the aspect(s) described may include a particular feature or characteristic, but every aspect may not necessarily include the particular feature, structure, or characteristic. Moreover, such phrases are not necessarily referring to the same aspect.

The terminology used herein is for the purpose of describing particular aspects only and is not intended to be limiting the scope of the disclosure and is not intended to be exhaustive. Many modifications and variations will be apparent to those of ordinary skill in the art without departing from the scope and spirit of the disclosure.

What is claimed is:

1. An electromagnet alignment system for in-situ alignment of at least one magnetic particulate material dispensed through an orifice of a dispensing nozzle used for 3D printing, comprising:
an electromagnet assembly comprising a coil, wherein the coil is configured to generate a pulsed magnetic field having a target magnetic flux intensity upon energization of the coil when the at least one magnetic particulate material is being heated and moved through the dispensing nozzle, such that the at least one magnetic particulate material is at least partially aligned with respect to a direction by the pulsed magnetic field; and
a power source for implementing the energization of the coil,
wherein the electromagnet assembly further comprises a tube having an inner surface proximal to the dispensing nozzle and an outer surface distal to the dispensing nozzle,
wherein the coil is cylindrical and wound around the outer surface of the tube, and
wherein the tube, the coil and the dispensing nozzle are concentric,
wherein the dispensing nozzle comprises: a connecting portion connected to a delivery port of an extruder of a 3D printer used for the 3D printing; a terminal portion comprising the orifice; and an elongated portion extending between the connecting portion and the terminal portion,
a heating layer attached to an outer surface of the elongated portion of the dispensing nozzle for maintaining the temperature of the elongated portion at a predetermined value,
an insulation layer provided between the heating layer and the inner surface of the tube,
wherein the insulation layer is configured to reduce heat-transferring from the heating layer to the tube,
wherein the heating layer and the insulation layer are provided between the outer surface of the elongated portion of the dispensing nozzle and the inner surface of the tube of the electromagnet assembly to provide frictional engagement between the outer surface of the elongated portion and the inner surface of the tube, such that the dispensing nozzle and the electromagnet assembly are coupled to each other through pressure and friction to prevent the dispensing nozzle from moving with respect to the electromagnet assembly.

2. The system according to claim 1, wherein the target magnetic flux intensity is in a range of 0.2 T-1 T.

3. The system according to claim 2, wherein the target magnetic flux intensity is in a range of 0.3-0.5 T.

4. The system according to claim 2, wherein the target magnetic flux intensity is in a range of 0.4-0.6 T.

5. The system according to claim 2, wherein the target magnetic flux intensity is in a range of 0.5-0.7 T.

6. The system according to claim 2, wherein the target magnetic flux intensity is in a range of 0.6-0.8 T.

7. The system according to claim 2, wherein the target magnetic flux intensity is in a range of 0.7-0.9 T.

8. The system according to claim 2, wherein the target magnetic flux intensity is in a range of 0.8-1.0 T.

9. The system according to claim 2, wherein the target magnetic flux intensity is based on at least one of: the at least one magnetic particulate material; a temperature of the heating of the at least one magnetic particulate material; and a binding material used in conjunction with the at least one magnetic particulate material.

10. The system according to claim 9, wherein the binding material comprises a thermoplastic polymer material.

11. The system according to claim 10, wherein the thermoplastic polymers include at least one of nylon, polyphenylene sulfide, polycarbonate and ABS.

12. The system according to claim 2, wherein a pulse width of the pulsed magnetic field is in a range of 1 millisecond to 10 seconds, wherein the pulse width is determined based on a flow rate of the least one magnetic particulate material through the orifice of the dispensing nozzle.

13. The system according to claim 12, wherein the pulse width is in a range 1 second to 5 seconds.

14. The system according to claim 12, wherein the pulse width is in a range 2 seconds to 6 seconds.

15. The system according to claim 12, wherein the pulse width is in a range 3 seconds to 7 seconds.

16. The system according to claim 12, wherein the pulse width is in a range 4 seconds to 8 seconds.

17. The system according to claim 12, wherein the pulse width is in a range 5 seconds to 9 seconds.

18. The system according to claim 12, wherein the pulse width is in a range 6 seconds to 10 seconds.

19. The system according to claim 1, wherein:
the coil has an inner surface radially proximal to the dispensing nozzle and an outer surface radially distal to the dispensing nozzle;
the coil has a first radius defined radially from a longitudinal central axis of the coil to the inner surface of the coil; and
the coil has a second radius defined radially from the longitudinal central axis of the coil to the outer surface of the coil.

20. The system according to claim 19, wherein:
the first radius is about 25.4 mm; and
the second radius is in a range of about 101.6 mm to about 254 mm.

21. The system according to claim 19, wherein:
the coil has a top surface and a bottom surface opposite each other in a direction of the longitudinal central axis;
the coil has a length defined between the top surface and the bottom surface in the direction of the longitudinal central axis; and
wherein the length of the coil is in a range of about 177.8 mm to 203.2 mm.

22. The system according to claim 1, wherein the connecting portion comprises a threaded portion.

23. The system according to claim 1, wherein the heating layer comprises a heating tape and a controller for controlling the heating temperature of the heating tape.

24. The system according to claim 1, wherein the dispensing nozzle is made of a non-magnetic stainless steel.

25. The system according to claim 1, wherein nylon is being used as a binding material with the at least one magnetic particulate material and wherein the predetermined value of the temperature is in a range of 180° C.-250° C.

26. The system according to claim 1, wherein polyphenylene sulfide (PPS) is being used as a binding material with the at least one magnetic particulate material and wherein the predetermined value of the temperature is in a range of 270° C.-324° C.

27. The system according to claim 1, wherein the tube is made of a thermo-insulation and non-magnetic material.

28. The system according to claim 1, further comprising a temperature sensor being configured to provide an instant temperature at the elongated portion of the dispensing nozzle, wherein the heating layer is adjustable based on the instant temperature for maintaining the temperature of the elongated portion at the predetermined value.

29. The system according to claim 1, further comprising a support associated with the electromagnet assembly, wherein the support comprises a base having an opening, wherein the electromagnet assembly is attached to the base, such that a central passageway defined by the inner surface of the tube is aligned with the opening of the base.

30. The system according to claim 1, further comprising a cooling device associated with the coil of the electromagnet assembly, wherein the cooling device is configured to maintain the temperature of the coil at a predetermined value.

31. The system according to claim 30, wherein the predetermined value is about 80° C.

* * * * *